United States Patent
Gurlahosur (10) Patent No.: US 11,196,286 B2
(45) Date of Patent: Dec. 7, 2021

(54) COMMUNICATION OF FAULT EVENT INFORMATION BETWEEN POWER SUPPLY DEVICES

(71) Applicant: TEXAS INSTRUMENTS INCORPORATED, Dallas, TX (US)

(72) Inventor: Sanjay Gurlahosur, Campbell, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 16/553,966

(22) Filed: Aug. 28, 2019

(65) Prior Publication Data
US 2020/0266657 A1    Aug. 20, 2020

Related U.S. Application Data

(60) Provisional application No. 62/808,120, filed on Feb. 20, 2019.

(51) Int. Cl.
*H02J 9/00* (2006.01)
*H02J 9/06* (2006.01)
*H02M 3/158* (2006.01)

(52) U.S. Cl.
CPC ............... *H02J 9/06* (2013.01); *H02M 3/158* (2013.01)

(58) Field of Classification Search
CPC .......................................................... H02J 9/06
USPC ............................................................ 307/64
See application file for complete search history.

(56) References Cited

U.S. PATENT DOCUMENTS

| | | | | |
|---|---|---|---|---|
| 6,501,196 B1* | 12/2002 | Lo | ............................. | H02J 9/06 307/125 |
| 2012/0176120 A1* | 7/2012 | Jefferies | .................. | H02H 1/063 324/124 |
| 2014/0028100 A1* | 1/2014 | Vogman | .................. | H02M 7/04 307/64 |

* cited by examiner

*Primary Examiner* — Daniel Cavallari
*Assistant Examiner* — Dru Parries
(74) *Attorney, Agent, or Firm* — Michelle F. Murray; Charles A. Brill; Frank D. Cimino (57) ABSTRACT

The present disclosure relates to communicating fault event information between power supply devices. In an example, a fault event communication system can include a comparator that can be coupled to a node that can have a shared bus voltage established by current sharing circuitry. The comparator can compare the shared bus voltage to a reference voltage and output a fault alert signal based on the comparison to alert a respective power supply device that another power supply device is experiencing a fault event. The system can include logic circuitry that can initiate a timer for a time interval in response to receiving the fault alert signal. The logic circuitry can determine a type of fault event at the respective power supply device based on the fault alert signal and duration of time that has elapsed since initiating the timer.

17 Claims, 5 Drawing Sheets

FIG. 5

COMMUNICATION OF FAULT EVENT INFORMATION BETWEEN POWER SUPPLY DEVICES

RELATED APPLICATION

This application claims priority from U.S. Provisional Patent Application Ser. No. 62/808,120, filed 20 Feb. 2019, which is incorporated herein in its entirety.

TECHNICAL FIELD

This disclosure relates to communicating fault event information between power supply devices.

BACKGROUND

A switch mode power supply (SMPS) is a type of power converter that uses switching circuits. Multiple SMPS can be connected in a parallel (or stacked) arrangement so as to have a common output node for supplying power to a load. Each power supply can be configured to deliver its proportionate share of load current. In a parallel connected power supply paradigm, each power supply can be configured with protection circuitry to protect the power supply from unwanted conditions, such as faults. In response to a fault event, for example, a short circuit, the power supply's protection circuitry is configured to take appropriate measures (e.g., cease switching operations) to protect components of the power supply from excessive damage.

SUMMARY

In an example, a system can include a comparator and logic circuitry. The comparator is coupled to a node of a first power supply device that is adapted to be coupled to a node of a second power supply device. The nodes of the first and second power supply devices are adapted to be coupled to a shared bus having a shared bus voltage. The comparator is configured to compare the shared bus voltage to a reference voltage and output a fault alert signal to alert the first power supply device that the second power supply device is experiencing a fault event. The logic circuitry is coupled to the comparator and configured to initiate a timer for a time interval in response to receiving the fault alert signal and further configured to determine a type of fault event at the second power supply device based on the fault alert signal and a duration of time that has elapsed since initiating the timer.

In another example, a power supply system can include a first power supply device and a second power supply device. The first power supply device can include a first fault communication circuit (FCC) and a first node. The first FCC is coupled to the first node. The second power supply device can include a second FCC and a second node. The second FCC is coupled to the second node. The second node is coupled to the first node. The first and second nodes are coupled to a shared bus having a shared bus voltage between the first and second power supply devices. The first FCC is configured to provide a path for current to flow from the shared bus to a ground in response to a fault event signal that indicates a fault event at the first power supply device. The second FCC is configured to provide a fault alert signal based on the shared bus voltage. The fault alert signal can alert the second power supply device that the first power supply device is experiencing the fault event. The second FCC is configured to initiate a timer for a time interval and determine a type of fault event that the first power supply device is experiencing based on the fault alert signal and a duration of time that has elapsed since initiating the timer.

In a further example, a circuit can include a switch, a comparator and logic circuitry. The switch can include a first input, a second input and an output. The first input of the switch is coupled to a first node of a first power supply device that is adapted to be coupled to a second node of a second power supply device. The output of the switch is coupled to a ground. The comparator can include a first input, a second input and an output. The first input of the comparator is coupled to the first node. The first input of the comparator is further coupled to the first input of the switch. The second input of the comparator is coupled to a reference voltage. The logic circuitry can include an input and an output. The input of the logic circuitry is coupled to the output of the comparator and the output of the logic circuitry is adapted to be coupled to an internal circuit of the first power supply device.

DETAILED DESCRIPTION

This disclosure relates to communicating fault event information between power supply devices.

In some examples, a fault event communication system includes a first fault communication circuit (FCC) and a second FCC. A first power supply device can include the FCC and a second power supply device, which is separate from the first power supply device, can include the second FCC. The first power supply device can be connected to the second power supply device by a shared bus, such as stacked in a parallel arrangement (e.g., including at least the first and second power supply devices). A current sharing circuit can be configured to establish a shared bus voltage at the shared bus. In some examples, the first power supply device includes the current sharing circuit. In response to a fault event, such as a thermal or a non-thermal fault event, at the second power supply device, the second FCC is configured to pull down the shared bus, such that the shared bus voltage decreases. The pulling down of the shared bus can indicate that the second power supply device is experiencing the fault event. In this way, pulling down of the shared bus by the second FCC thus can communicate to the first FCC that the second power supply device is experiencing the fault event.

The first FCC is configured to determine a type of fault event at the second power supply device based on the shared bus voltage. For example, the first FCC is configured to generate a fault alert signal in response to determining that the shared bus voltage is equal to or less than a reference voltage. The first FCC is further configured to initiate (e.g., start) a timer for a time interval in response to determining that the shared bus voltage is equal to or less than the reference voltage. The first FCC is configured to determine the type of fault event occurring at the second power supply device based on the fault alert signal and a duration of time that has elapsed since the timer has been initiated. Accordingly, the first power supply device can differentiate between thermal and non-thermal fault events that may occur at the second power supply device based on the shared bus voltage between the respective power supply devices. In some examples, the first power supply device is configured to enter a select mode of operation, such as a stand-by mode or a power cycle mode (e.g., a hiccup mode), based on the type of fault event at the second power supply device. In response to the fault event being cleared at the second power supply device, the first power supply device can resume normal operations.

In some examples, in response to a fault event occurring at the first power supply device, the first FCC is configured to pull down the shared bus, such that the shared bus voltage can decrease. The pulling down of the shared bus by the first power supply device can indicate that the first power supply device is experiencing the fault event, and thus can communicate to the second FCC that the first power supply device is experiencing the fault event. The second FCC is configured to generate a fault alert signal in response to determining that the shared bus voltage is equal to or less than a reference voltage, such as in response to the fault event at the first power supply device. The second power supply device is configured to enter a select mode of operation (e.g., in response to the fault alert signal). In some examples, the second power supply device is configured to enter a similar mode of operation (e.g., the power cycle mode) as the first mode of operation, such that the second power supply device follows the mode of operation of the first power supply device.

As a further example, the systems and devices described herein can be integrated into an integrated circuit (IC), or in some examples, can be provided as a standalone circuit (e.g., standalone element or system on chip (SoC)) that can be mounted on a surface of a printed circuit board (PCB). In other examples, the systems described herein can be provided as plug-in elements that can be coupled to sockets (e.g., receiving terminals) of the PCB including elements to implement one or more functions, as described herein.

As used herein, the term "circuit" can include a collection of active and/or passive elements that perform a circuit function, such as an analog circuit or digital circuit. Additionally or alternatively, for example, the term "circuit" can include an IC where all or some of the circuit elements are fabricated on a common substrate (e.g., semiconductor substrate, such as a die or chip), such as disclosed herein. For example, the circuit and/or associated logic and detection circuitry may be implemented as a respective IC chip or within a multi-chip module. Logic and detection circuitry can include discrete components configured to execute a respective function. In other examples, the logic and detection circuitry can include a controller, processor, digital signal processor, or gate array.

Additionally, the term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 1:
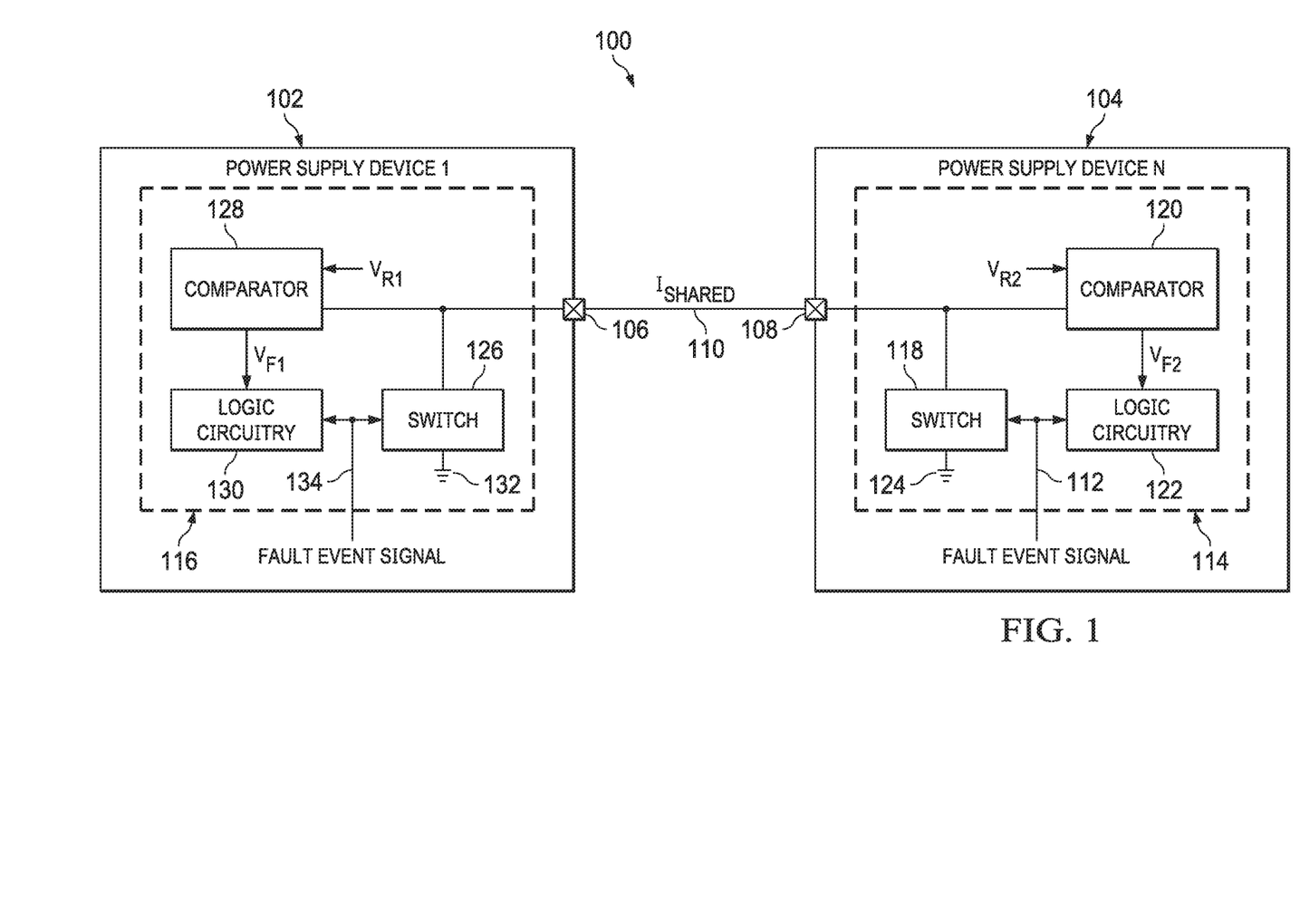
FIG. 1 illustrates an example of a power supply system configured with a fault event communication system.

FIG. 1 illustrates an example of a power supply system 100 configured with a fault event communication system. The fault event communication system can be employed to communicate fault event information between N number of power supply devices, wherein N is an integer greater than or equal to two. In some examples, each of the power supply devices is a switch mode power supply (SMPS). The SMPS may be implemented according to a variety of different topologies including flyback, forward, buck, boost and buck-boost. The power supply devices can include a first power supply device 102 (labeled in FIG. 1 as "POWER SUPPLY DEVICE 1") and a second power supply device 104 (labeled in FIG. 1 as "POWER SUPPLY DEVICE N"). In some examples, the first and second power supply devices 102, 104 are identical or similar. In other examples, the first and second power supply devices 102, 104 are different power supplies (e.g., in construction), however, may be configured to have similar operational parameters.

In some examples, a system load may have a greater current requirement than that may be provided by one of the first and second power supply devices 102, 104. To meet the current requirements of the system load, the first and second power supply devices 102, 104 can be coupled, such that respective output nodes (not shown in FIG. 1) of the first and second power supply devices 102, 104 are connected together in parallel to the system load. The connecting of the power supply devices 102, 104 in parallel in some examples may be referred to as stacking. The stacking of the first and second power supply devices 102, 104 allows for a greater load current to be provided to the system load than can be provided individually by one of the first and second power supply devices 102, 104. By connecting the output nodes of the first and second power supply devices 102, 104 in parallel, each of the power supply devices 102, 104 can be configured to supply a portion of the load current to the system load. Accordingly, the first and second power supply devices 102, 104 can be configured to share the load current requirements for the system load. In some examples, the outputs of the first and second power supply devices 102, 104 can be connected together through protection circuitry (e.g., decoupling diodes) to the system load to protect each of the power supply devices 102, 104 from reverse currents (e.g., caused by fault events).

In some examples, the first and second power supply devices 102, 104 include respective nodes 106, 108. For example, the nodes 106 and 108 are terminals (e.g., pins) of respective IC chips that are configured to implement each of the respective power supply devices 102 and 104. The nodes 106, 108 can be coupled to a shared bus 110 between the first and second power supply devices 102, 104. A shared bus voltage ($I_{SHARED}$) can be established at the shared bus 110 by current sharing circuitry (not shown in FIG. 1, but see, e.g., the current sharing circuitry 230 of FIGS. 2A-2B). The shared bus voltage ($I_{SHARED}$) can be representative of an average current ($I_{AVG}$) of each of the first the second power supply devices 102, 104 that can be supplied to the system load. In other examples, the shared bus voltage ($I_{SHARED}$) is representative of a current being provided by the first power supply device 102.

Figure 2A:
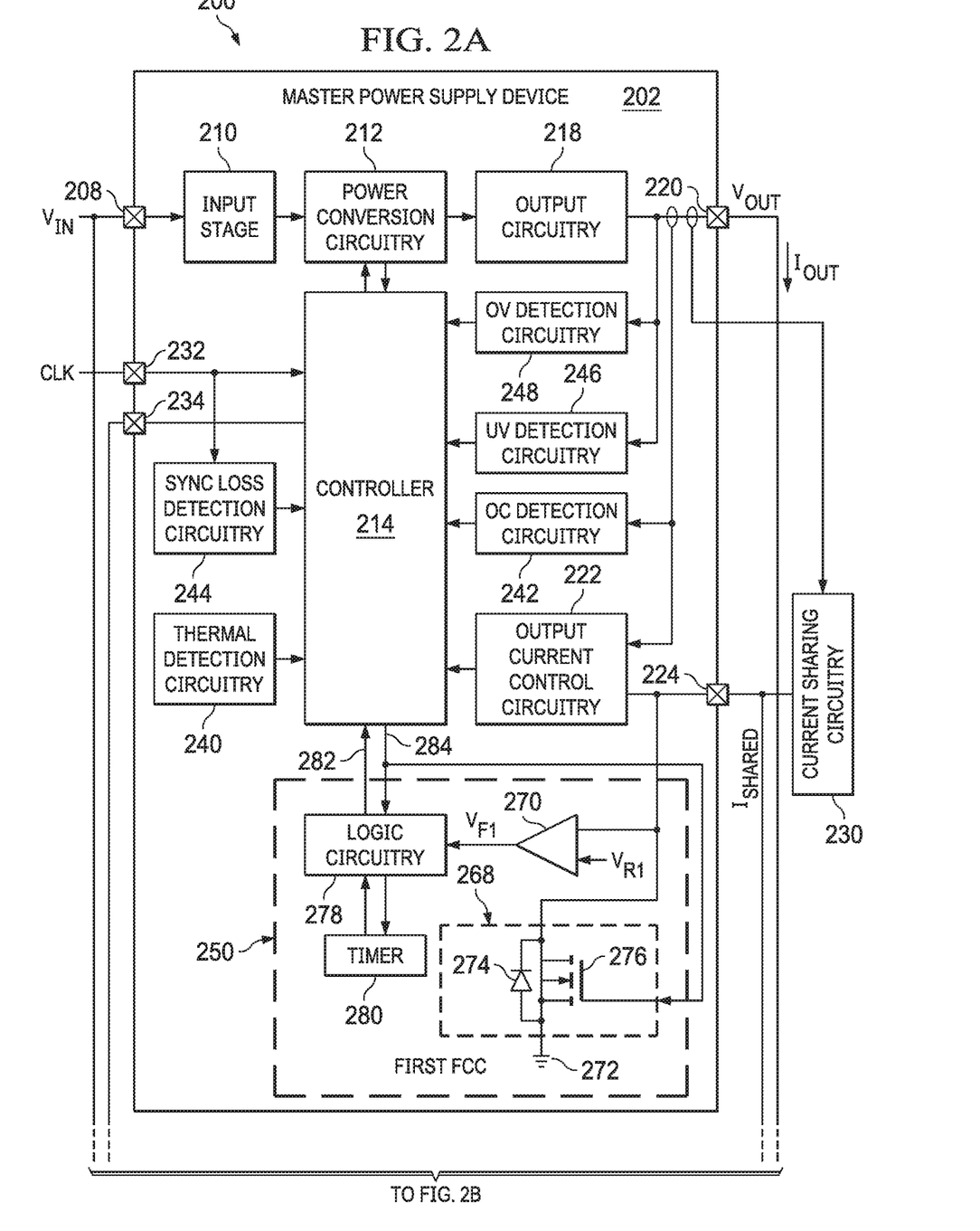
FIGS. 2A-2B illustrate an example of a parallel power supply system configured with a fault event communication system.
Figure 2B:
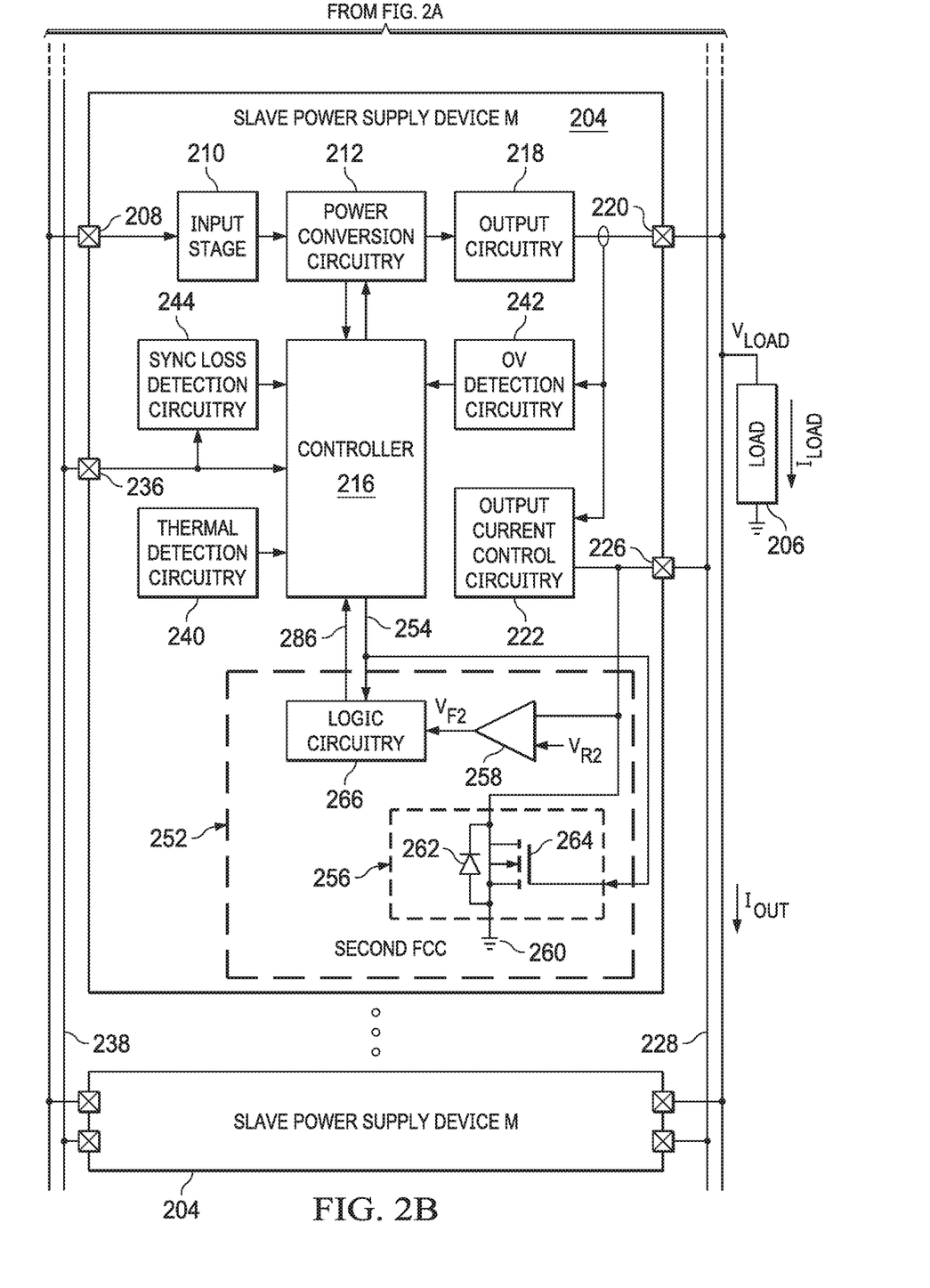

To protect each of the power supply devices 102, 104 against fault events, the first and second power supply devices 102, 104 include protection circuitry (not shown in FIG. 1 but see, e.g., the protection circuitry 240, 242, 244, 246 and 248 of FIGS. 2A-2B). The fault events can include thermal fault events and non-thermal fault events. A "thermal fault event" as used herein refers to a temperature causing condition at a power supply device that results in the power supply device experiencing a temperature equal to or greater than an operating temperature threshold for the power supply device. Example thermal fault events include thermal shut down (TSD) events.

In response to the thermal fault event, the respective power supply device 102, 104 can be configured to enter a stand-by mode. In the stand-by mode, the respective power supply device 102, 104 can be configured to cease switching operations for a period of time (e.g., 100 microseconds (µs)) until the temperature of the respective power supply device 102, 104 decreases to within a normal operating range (e.g., below the operating temperature threshold). Accordingly, each of the power supply devices 102, 104 can be configured to turn off for the period of time, such that the output voltage ($V_{OUT}$) is minimal (e.g., about 0 volts (V)), and turn back on to recover the output voltage to normal operation in response to the thermal fault event being cleared.

As used herein, "non-thermal fault event" refers to a non-temperature causing condition at a power supply device that results in the power supply device operating abnormally (e.g., outside normal operating conditions). Example non-thermal fault events can include an overvoltage (OV) event, an overcurrent current (OC) event, an undervoltage (UV) event and a synchronization loss (SL) event. The respective power supply device 102, 104 can be configured to enter a power cycling mode and attempt an auto restart (e.g., soft restart) in response to the non-thermal fault event. For example, in the power cycling mode, the respective power supply device 102, 104 can be cyclically turned off for a period of time and turned on for another period of time until the fault has been cleared. If the fault is removed (e.g., has been cleared), the respective power supply device 102, 104 can restart and re-establish normal operation. If the fault remains, the respective power supply device 102, 104 can remain in the power cycling mode and continue the turn on and turn off pattern. This mode of power supply protection can be referred to as "hiccup mode." Accordingly, in the hiccup mode, the switching operations of the respective power supply device 102, 104 can be interrupted then reactivated cyclically so as to limit (e.g., avoid) power dissipation at the respective power supply device 102, 104.

In some examples, the second power supply device 104 is configured to generate a fault event signal 112 in response to experiencing a fault event. The fault event signal 112 can be provided by the protection circuitry of the second power supply device 104. In other examples, the fault event signal 112 is provided by a controller (not shown in FIG. 1, but see e.g., the controller 216 of FIG. 2A) of the second power supply device 104 based on a protection signal from the protection circuitry. The protection signal can indicate that the second power supply device 104 is experiencing a fault event. In either example, the fault event signal 112 is provided to a fault communication circuit (FCC) 114 of the second power supply device 104. The FCC 114 is configured to communicate to an FCC 116 of the first power supply device 102 based on the fault event signal 112 to notify the first power supply device 102 that the second power supply device is 104 experiencing the fault event. The FCC 114 and the FCC 116 can define (e.g., form) the fault event communication system, as described herein. The first power supply device 102 is configured to enter one or more different modes of operation based on a type of fault event that the second power supply device 104 is experiencing.

In the example of FIG. 1, the FCC 114 of the second power supply device 104 includes a switch 118, a comparator 120 and logic circuitry 122. The switch 118 is coupled to a ground 124 and further coupled to the node 108 to couple the switch 118 to the shared bus 110. The switch 118 can be turned on (e.g., actuated, activated, etc.) to pull down the shared bus 110 for a time interval (e.g., 50 µs) based on the fault event signal 112. By pulling down the shared bus 110, the shared bus voltage ($I_{SHARED}$) can decrease since the bus current can flow to the ground 124. The pulling of the shared bus 110 down can indicate that the second power supply device 104 is experiencing the fault event. Thus, the pulling of the shared bus 110 down can communicate to the FCC 116 of the first power supply device 102 that the second power supply device 104 is experiencing the fault event.

The comparator 120 is coupled to the node 108 and configured to compare the shared bus voltage ($I_{SHARED}$) to a reference voltage ($V_{R2}$). In response to the shared bus voltage ($I_{SHARED}$) being equal to or less than the reference voltage ($V_{R2}$), the comparator 120 is configured to generate a fault alert signal ($V_{F2}$). The fault alert signal ($V_{F2}$) can be provided to the logic circuitry 122 of the FCC 114. In some examples, the logic circuitry 122 can be configured to receive both the fault alert signal ($V_{F2}$) and the fault event signal 112 (e.g., over a same time interval). By receiving both the fault alert signal ($V_{F2}$) and the fault event signal 112 can provide a confirmation that fault event information has been communicated to the first power supply device 102 by the shared bus 110. In response to a thermal fault event at the second power supply device 104, the second power supply device 104 is configured to hold the shared bus 110 down to provide an indication that the second power supply device 104 is experiencing a thermal fault event. In these examples, the second power supply device 104 is configured to hold shared bus 110 down until the thermal event at the second power supply device 104 has cleared. The second power supply device 104 can be configured to enter a stand-by mode until the thermal event at the second power supply device 104 has been cleared.

In other examples, in response to a non-thermal fault event at the second power supply device 104, the second power supply device 104 is configured to pull down the shared bus 110 for a period of time and release the shared bus 110 to provide an indication that the second power supply device 104 is experiencing a non-thermal fault event. The first power supply device 102 can be configured to cause the second power supply device 104 to enter a similar mode of operation as the first power supply device 102 in response to determining that the second power supply device 104 is experiencing the non-thermal fault event. Thus, the first power supply device 102 can be configured to cause the second power supply device 104 to enter the power cycle mode in response to determining that the second power supply device 104 is experiencing the non-thermal fault event. The first power supply device 102 can be configured to cause the second power supply device 104 to enter the power cycle mode by pulling down the shared bus 110 in response to determining that the second power supply device 104 is experiencing the non-thermal fault event, as described herein. The second power supply device 104 can detect the pulling of the shared bus 110 down and switch modes of operations to the power cycle mode.

In some examples, the FCC 116 of the first power supply device 102 is configured to monitor the shared bus 110 for a decrease in voltage of the shared bus voltage ($I_{SHARED}$). Similar to the FCC 114, the FCC 116 includes a switch 126, a comparator 128 and logic circuitry 130. The switch 126 can be coupled to a ground 132 and further coupled to the node 106 to couple the switch 126 to the shared bus 110. In some examples, the ground 132 and the ground 124 are similar grounds (e.g., earth ground, chassis ground, etc.). The comparator 128 can be coupled to the node 106 and configured to compare the shared bus voltage ($I_{SHARED}$) to a reference voltage ($V_{R1}$). In some examples, the reference voltage ($V_{R1}$) is the same as the reference voltage ($V_{R2}$). The comparator 128 is configured to generate a fault alert signal ($V_{F1}$) in response to the shared bus voltage ($I_{SHARED}$) being equal to or less than the reference voltage ($V_{R1}$), such as in response to the fault occurring at the second power supply device 104. The logic circuitry 130 is coupled to receive the fault alert signal ($V_{F1}$) from the comparator 128.

The logic circuitry 130 is configured to determine the type of fault event that the second power supply device 104 is experiencing based on the shared bus voltage ($I_{SHARED}$). For example, the logic circuitry 130 is configured to receive the fault alert signal ($V_{F1}$). The logic circuitry 130 is configured to initiate (e.g., start) a timer (not shown in FIG. 1, but see, e.g., timer 280 of FIG. 2A) for a time interval (e.g., 76 µs) in response to receiving the fault alert signal ($V_{F1}$). The logic circuitry 130 is configured to determine the type of fault event (e.g., thermal fault event or non-thermal fault event) occurring at the second power supply device 104 based on the fault alert signal ($V_{F1}$) and an amount of time that has elapsed since the timer has been initiated. Accordingly, the first power supply device 102 can differentiate between thermal and non-thermal fault events that may occur at the second power supply device 104 based on the shared bus voltage ($I_{SHARED}$) at the shared bus 110 coupled between the respective power supply devices 102, 104.

In some examples, the logic circuitry 130 is configured to monitor the fault alert signal ($V_{F1}$) for a transition from a first state (e.g., "HIGH") to a second state (e.g., "LOW") in response to initiating the timer for the time interval. For example, the logic circuitry 130 is configured to determine that the second power supply device 104 is experiencing a non-thermal type of fault event, such as the sync loss event or a transient power event, in response to determining that the fault alert signal ($V_{F1}$) is still in the second state (and has not transitioned back to the first state) before the timer has expired. The logic circuitry 130 can be configured to cause the first power supply device 102 to enter the power cycling mode (e.g., hiccup mode) in response to determining that the second power supply device 104 is experiencing a non-thermal fault event. The first power supply device 102 can be configured to cause the second power supply device 104 to enter a similar mode of operation by pulling down the shared bus 110 in response to determining that the second power supply device 104 is experiencing the non-thermal fault event. In some examples, the logic circuitry 130 is configured to keep the first power supply device 102 in the power cycling mode until the non-thermal fault event at the second power supply device 104 is cleared. The first power supply device 102 can be configured to hold the shared bus 110 down while in the power cycling mode and release the shared bus 110 in response to the fault being cleared at the second power supply device 104 to cause the second power supply device 104 to resume normal operations.

In yet other examples, the logic circuitry 130 is configured to determine that the second power supply device 104 is experiencing a thermal type of fault event, such as the TSD event, in response to detecting that the fault alert signal ($V_{F1}$) is in the first state and determining that the time interval has expired. The logic circuitry 130 can be configured to cause the first power supply device 102 to enter a stand-by mode in response to detecting the thermal type of fault event. In the stand-by mode, the first power supply device 102 can be configured to cease switching operations and remain turned off until the thermal fault event at the second power supply device 104 is cleared.

Accordingly, the first power supply device 102 can be configured to enter a select mode of operation, such as the power cycling mode and the stand-by mode in response to the FCC 114 pulling down of the shared bus 110 and the amount of time that has elapsed during the pulling down of the shared bus. In some examples, in response to the fault being cleared at the second power supply device 104, the first power supply device 102 is configured to restart and implement synchronization procedures, such that the second power supply device 104 can synchronize switching operations with the first power supply device 102.

As a further example, the first power supply device 102 is configured to generate a fault event signal 134 in response to experiencing a fault event. The first power supply device 102 can be configured to enter a select mode of operation, such as the stand-by mode or the power cycle mode, based on the type of fault at the first power supply device 102. In some examples, the protection circuitry of the first power supply device 102 is configured to provide the fault event signal 134. In other examples, a controller (not shown in FIG. 1, but see e.g., the controller 214) of the first power supply device 102 is configured to provide the fault event signal 134 based on a protection signal from the protection circuitry from the first power supply device 102. The protection signal can indicate that the first power supply device 102 is experiencing a fault event. In either example, the fault event signal 134 is provided to the FCC 116, as illustrated in FIG. 1.

The FCC 116 is configured to communicate with the FCC 114 of the second power supply device 104 to notify the second power supply device 104 that the first power supply device is 102 is experiencing the fault event in response to the fault event signal 134 signal. The second power supply device 104 is configured to enter a select mode of operation (e.g., in response to the fault alert signal ($V_{F2}$)). In some examples, the second power supply device 104 is configured to enter a similar mode of operation as the first power supply device 102 in response to the fault event, such that the second power supply device 104 follows the mode of operation of the first power supply device 102. Thus, for non-thermal fault events, the second power supply device 104 can enter the power cycle mode until the non-thermal fault is cleared at the first power supply device 102. In response to the non-thermal fault event being cleared at the first power supply device 102, the second power supply device 104 can be configured to resume normal operating conditions (e.g., change from the select mode of operation (e.g., the power cycle mode) to a normal mode of operation) and can synchronize switching operations with the first power supply device 102.

By way of example, the switch 126 of the FCC 114 can be turned on (e.g., actuated, activated, etc.) to pull down the shared bus 110 for a time interval (e.g., 50 µs) based on the fault event signal 134. By pulling down the shared bus 110, the shared bus voltage ($I_{SHARED}$) can decrease since the bus current can flow to the ground 132 through the switch 126. Because the second power supply device 104 is coupled to the shared bus 110, the pulling of the shared bus 110 down can indicate to the FCC 114 of the second power supply device 104 that the first power supply device 102 is experiencing the fault event. The comparator 128 can configured to compare the shared bus voltage ($I_{SHARED}$) to the reference voltage ($V_{R1}$). The comparator 128 can be configured to generate the fault alert signal ($V_{F1}$) in response to the shared bus voltage ($I_{SHARED}$) being equal to or less than the reference voltage ($V_{R1}$). In some examples, the logic circuitry 130 is configured to receive both the fault alert signal ($V_{F1}$) and the fault event signal 134 (e.g., over a same time interval). Receiving both the fault alert signal ($V_{F1}$) and the fault event signal 134 can provide a confirmation that fault event information has been communicated to the second power supply device 104 by the shared bus 110. In response to the fault event, the first power supply device 102 can be configured to enter a mode of operation, such as the power cycling mode or the stand-by down mode based on the type of fault event that is occurring at the first power supply device 102.

Accordingly, the fault event communication system allows the power supply devices 102, 104 to communicate fault event information to one another through the shared bus 110. The fault event communication system can cause the first power supply device 102 to enter a select mode of operation based on the type of fault event that the second power supply device 104 is experiencing so that abnormal operations (e.g., undesired behaviors) of the first power supply device 102 can be avoided (e.g., reduced). For thermal fault type of events at the second power supply device 104, the first power supply device 102 can be configured to enter a stand-by mode of operation during which the first power supply device 102 is configured to cease switching operations until the thermal fault event at the second power supply device 104 has been cleared. For non-thermal fault type of events at the second power supply device 104, the first power supply device 102 can be configured to enter the power cycle mode until the non-thermal fault event is cleared at the second power supply device 104. In response to a fault event (e.g., the thermal fault event or the non-thermal fault event) being cleared at the second power supply device 104, the first and second power supply devices 102, 104 can be configured to resume normal operations.

Thus, the fault event communication system enables the first power supply device 102 to differentiate between thermal and non-thermal fault events that may occur at the second power supply device 104 based on the shared bus voltage ($I_{SHARED}$). The mode of operation of the first power supply device 102 can be controlled (e.g., regulated), such that the first power supply device 102 does not power cycle (e.g., hiccup) while the second power supply device 104 is cooling down during a thermal fault event, which can cause strains and stresses on components of the first power supply device 102. Thus, the fault event communication system can reduce (e.g., alleviate) strains and stresses on components of the first power supply device 102 by minimizing power cycling of the first power supply device 102 during thermal fault events at the second power supply device 104. Moreover, the fault event communication system allows for employing of existing nodes (e.g., pins) of the first and second power supply devices 102, 104 for communication of different types of fault events, and thus does not require additional components and circuitry for communication of fault information.

FIGS. 2A-2B illustrate an example of a parallel power supply system 200 configured with a fault event communication system. The parallel power supply system 200 includes power supply devices 202, 204. The power supply devices 202, 204 can be coupled in parallel and configured according to a master-slave current sharing paradigm. In some examples, each of the power supply devices 202, 204 is a switch mode power supply (SMPS). The SMPS may be implemented according to a variety of different topologies including flyback, forward, buck, boost, and buck-boost. In some examples, the power supply devices 202, 204 are identical or similar. In other examples, the power supply devices 202, 204 are different power supplies (e.g., in construction), however, are configured to have similar operational parameters.

In the master-slave configuration, a select power supply device 202 of the parallel power supply system 200 is configured as a master power supply device (labeled in FIG. 2A as "MASTER POWER SUPPLY DEVICE"). One or more M number of remaining power supply devices 204 (labeled in FIG. 2B as "SLAVE POWER SUPPLY DEVICE M") of the parallel power supply system 200 can be configured as slave power supply devices, wherein M is an integer greater than or equal to one. For example, the power supply device providing a greatest output ($I_{OUT}$) is configured as the master power supply device 202 and all remaining power supply device(s) are configured as slave power supply devices 204. In other examples, a select power supply device is configured as the master power supply device 202 and the remaining power supply devices are configured as the slave power supply devices 204. In these examples, a current sharing balancing scheme can be employed, such that each of the power supply devices 202, 204 provides a similar output current ($I_{OUT}$).

As illustrated in FIGS. 2A-2B, the master power supply device 202 and the slave power supply device 204 can be controlled to provide a respective output voltage ($V_{OUT}$) as a load voltage ($V_{LOAD}$) to a system load 206. In some examples, the system load 206 is employed in (e.g., forms part of) a high-current application. Exemplary high-current applications can include automotive start-stop systems, industrial systems, telecommunication systems, home appliances, television sets, lighting systems, electronic devices, computer systems (e.g., desktop computers, servers, laptops, tablets, smart-phones, etc.) and a variety of other applications. Each of the master and slave power supply devices 202, 204 can be configured to supply a portion (e.g., about 50%) of the load current ($I_{LOAD}$) to the system load 206. Accordingly, the master and slave power supply devices 202, 204 can be configured to share the load current requirements for the system load 206.

By way of example, the master and slave power supply devices 202, 204 are configured to receive at respective input nodes 208 an input voltage ($V_{IN}$). The input voltage ($V_{IN}$) can include an alternating-current (AC) voltage or a direct-current (DC) voltage. In some examples, each of the master and slave power supply devices 202, 204 include an input stage 210. The input stage 210 can be an input circuit configured to receive the input voltage ($V_{IN}$) and apply input rectification and/or filtering to the input voltage ($V_{IN}$) to provide an input stage voltage ($V_{INPUT}$). The input stage voltage ($V_{INPUT}$) can be supplied to respective power conversion circuitry 212 of the master and slave power supply devices 202, 204. In some examples, the input stage 210 is omitted (in each or one of the power supply devices 202, 204) and the input voltage ($V_{IN}$) can be supplied to the respective power conversion circuitry 212.

The respective power conversion circuitry 212 can be configured to provide an output voltage ($V_{OUT}$) based on the input stage voltage ($V_{INPUT}$) (or the input voltage ($V_{IN}$), in other examples). In some examples, a power conversion circuitry 212 of each respective power supply device 202, 204 is configured to provide auxiliary supply voltage for powering one or more circuits (or components) of the respective power supply device 202, 204, such as described herein. The specific circuitry within each power conversion circuitry 212 can be dependent upon the SMPS topology. For example, for an isolated SMPS topology, the power conversion circuitry 212 includes a transformer for stepping the input stage voltage ($V_{INPUT}$) (or the input voltage ($V_{IN}$)) up or down. In other examples, such as for non-isolated SMPS topologies (e.g., buck converter), the power conversion circuitry 212 includes circuitry for rectifying the input stage voltage ($V_{INPUT}$) (or the input voltage ($V_{IN}$)) to produce the output voltage ($V_{OUT}$).

In some examples, the power conversion circuitry 212 includes one or more power switches (not shown in FIGS. 2A-2B). The one or more power switches of the power conversion circuitry 212 of the master power supply device 202 can be operated by a controller 214 of the master power supply device 202 while the one or more power switches of the power conversion circuitry 212 of the slave power supply device 204 can be operated by a controller 216 of the slave power supply device 204. The one or more power switches can include metal-oxide semiconductor field-effect transistors (MOSFETs), junction field-effect transistors (JFETs), bipolar junction transistors (BJTs), insulated gate bipolar transistors (IGBTS), high electron mobility transistors (HEMTs), or other types of power transistors depending on the high-current application.

In some examples, each of the master and slave power supply devices 202, 204 include output circuitry 218. The output circuitry 218 of each device 202, 204 can be coupled to respective power conversion circuitry 212. Respective output circuitry 218 can be configured to provide output rectification and filtering (e.g., such as to remove harmonics) of the output voltage ($V_{OUT}$). Thus, in some examples, the output circuitry 218 can include filtering circuitry, such as an inductor-capacitor (LC) network. The output circuitry 218 of each device 202, 204 can be coupled to a respective output node 220. In other examples, the output circuitry 218 is omitted from each or one of the master and slave power supply devices 202, 204. In these examples, the power conversion circuitry 212 is coupled to the respective output node 220. In some examples, output nodes 220 of the master and slave power supply devices 202, 204 are coupled together through protection circuitry (e.g., decoupling diodes) (not shown in FIGS. 2A-2B) to the system load 206 to protect each of the master and slave power supply devices 202, 204 from reverse currents (e.g., caused by fault events). In other examples, the output nodes 220 are coupled directly to the system load 206, such as without intervening protection circuitry. The output voltage ($V_{OUT}$) provided by each of the master and slave power supply devices 202, 204 can include an AC output voltage or a DC output voltage.

During a normal mode of operation, the one more power switches of the power conversion circuitry 212 of respective devices 202, 204 can be configured to switch (e.g., turned on and turned off), such that the output voltage ($V_{OUT}$) can be provided at the respective output nodes 220 of the master and slave power supply devices 202, 204. The respective controllers 214, 216 can govern the switching frequency of the respective power conversion circuitry 212 by varying parameters, such as the frequency and duty cycle of a pulse-width-modulated (PWM) signal. The PWM signal can be used to drive the one or more power switches by one or more respective driver circuits (not shown in FIGS. 2A-2B) to provide the output voltage ($V_{OUT}$) as the load voltage ($V_{LOAD}$) to the system load 206. The respective controllers 214, 216 can include a voltage regulator (not shown in FIGS. 2A-2B) that can include a PWM generator for generating the PWM signal(s).

To ensure that the master and slave power supplies devices 202, 204 provide a portion of an output current ($I_{OUT}$), such that the load current ($I_{LOAD}$) is shared, the master and slave power supply devices 202, 204 can be configured with output current control circuitry 222. The output current control circuitry 222 of the master power supply device 202 can be coupled to a node 224 of the master power supply device 202 and the output current control circuitry 222 of the slave power supply device 204 can be coupled to a node 226 of the slave power supply device 204. The nodes 224, 226 can be coupled to one another to establish a shared bus 228. In some examples, the nodes 224, 226 are terminals (e.g., "ISHARE" pins) of the master and slave power supply devices 202, 204.

By coupling the nodes 224, 226 to one another, a shared bus voltage ($I_{SHARED}$) can be established at the shared bus 228 by current sharing circuitry 230. In some examples, the current sharing circuitry 230 forms part of the master power supply device 202 or the slave power supply device 204. In an example, the shared bus voltage ($I_{SHARED}$) is representative of an average current ($I_{AVG}$) of the master and slave power supply devices 202, 204. In these examples, the current sharing circuitry 230 is configured to measure the output current ($I_{OUT}$) of each of the master and slave power supply devices 202, 204. The current sharing circuitry 230 is configured to determine the average current ($I_{AVG}$) for the slave and master power supply devices 202, 204 and output the shared bus voltage ($I_{SHARED}$) characterizing the average current ($I_{AVG}$). The output current control circuitry 222 of the respective power supply device 202, 204 can be configured to monitor the output current ($I_{OUT}$) being provided by the respective power supply device 202, 204. The output current control circuitry 222 of the respective power supply device 202, 204 can cause the respective power supply device 202, 204 to adjust the output current ($I_{OUT}$) being delivered for a respective portion of the load current ($I_{LOAD}$) based on the shared bus voltage ($I_{SHARED}$).

In other examples, the shared bus voltage ($I_{SHARED}$) can be representative of the output current ($I_{OUT}$) being provided by the master power supply device 202. In these examples, the output current ($I_{OUT}$) of the master power supply device 202 is used as a reference for adjusting the output current ($I_{OUT}$) of the slave power supply device 204. The output current control circuitry 222 of the master power supply device 202 can be configured to measure the output current ($I_{OUT}$) being provide by the master power supply device 202 and provide the shared bus voltage ($I_{SHARED}$) at the shared bus 228 based on the measured output current ($I_{OUT}$). In these examples, the current sharing circuitry 230 may be omitted.

Accordingly, the master and slave power supply devices 202, 204 can be configured to achieve current sharing for the system load 206, such that the master and slave power supply devices 202, 204 provides a portion of the load current ($I_{LOAD}$).

In further examples, the master power supply device 202 is configured to receive at a node 232 an external clock signal (CLK). The external clock signal (CLK) can be generated by an external clock (not shown in FIG. 2A). The external clock signal (CLK) can be supplied to the controller 214 to synchronize a clock frequency of the master power supply device 202 with the external clock. In some examples, the master and slave power supply devices 202, 204 are synchronized, such that a clock frequency of the master and slave power supply devices 202, 204 are similar. To synchronize the clock frequency of the slave power supply device 204 with the master power supply device 202, the master power supply device 202 is configured to output a clock synchronization signal. The synchronization signal can be provided to a node 234 of the master power supply device 202. The node 234 can be coupled to the node 236 of the slave power supply device 204 to provide a sync bus 238. The synchronization signal can be representative of a clock signal established at the master power supply device 202 based on the external clock signal (CLK). The clock signal can be provided by a first oscillator (not shown in FIG. 2A) of the master power supply device 202. In some examples, the controller 214 can include the first oscillator. Thus, the synchronization signal can have a frequency similar to a frequency of the clock signal being provided by the first oscillator of the master power supply device 202 based on the external clock signal (CLK).

The node 236 can supply the synchronization signal to the controller 216 of the slave power supply device 204. The controller 216 can be configured to adjust a clock frequency of a clock signal provided by a second oscillator (not shown in FIG. 2B) of the slave power supply device 204 to match the clock frequency of the clock signal at the master power supply device 202 based on the synchronization signal. In some examples, the controller 216 can include the second oscillator. In other examples, the master and slave power supply devices 202, 204 can be synchronized using a different synchronization schema, such as based on an internal clock (e.g., the first oscillator) of the master power supply device 202. In these examples, the master power supply device 202 is configured to provide the synchronization signal based on the internal clock.

The respective power supply devices 202, 204 can be configured with one more protection circuits for fault event protection. For example, the master and slave power supply devices 202, 204 include thermal detection circuitry 240. The thermal detection circuitry 240 can be configured to monitor the respective power supply device 202, 204 for protection against TSD faults. In an example, the thermal detection circuitry 240 is configured to monitor a die temperature of an IC on which the respective power supply device 202, 204 can be implemented. The thermal detection circuitry 240 can be configured to output an over-temperature protection signal in response to determining that the temperature of the respective power supply device 202, 204 is equal to or greater than a temperature threshold. The over-temperature protection signal can be provided to a respective controller 214, 216. The respective controller 214, 216 can be configured to cause respective power conversion circuitry 212 (e.g., the one or more power switches) to be turned off until the respective power supply device 202, 204 has cooled down.

In some examples, each of the master and slave power supply devices 202, 204 include overcurrent (OC) detection circuitry 242 for protection against overcurrent (OC) faults. The OC detection circuitry 242 can be configured to monitor a power supply path for overcurrent and output an OC protection signal in response to detecting an OC fault. For example, the OC detection circuitry 242 of the respective power supply device 202, 204 is configured to monitor the output current ($I_{OUT}$) being provided by the respective power supply device 202, 204. The OC detection circuitry 242 is configured to output the OC protection signal in response to determining that the output current ($I_{OUT}$) exceeds an output reference current or a respective output node 220 is shorted to ground. The OC protection signal can be provided to the respective controller 214, 216. The respective controller 214, 216 can be configured to cause respective power conversion circuitry 212 (e.g., the one or more power switches) to be turned off until the OC fault at the respective power supply device 202, 204 has been cleared.

In further examples, each of the master and slave power supply devices 202, 204 includes sync loss (SL) detection circuitry 244. The SL detection circuitry 244 can be configured to protect each power supply device 202, 204 from a sync loss event. For example, in response to detecting a loss in frequency synchronization with the external clock signal (CLK), the SL detection circuitry 244 of the master power supply device 202 can be configured to output an SL protection signal. The SL detection circuitry 244 can compare a frequency of the external clock signal (CLK) and the clock frequency of the clock signal generated by the first oscillator. The SL detection circuitry 244 of the master power supply device 202 can be configured to output the SL protection signal based on the comparison. The SL protection signal can be provided to the controller 214. The controller 214 can be configured to cause the power conversion circuitry 212 (e.g., the one or more power switches) of the master power supply device 202 to be turned off until the SL fault has been cleared. During the sync loss event at the slave power supply device 204, the SL detection circuitry 244 at the slave power supply device 204 can be configured to compare a frequency of the synchronization signal and the clock frequency of the clock signal generated by the second oscillator. The SL detection circuitry 244 can be configured to output an SL protection signal based on the comparison. The SL protection signal can be provided to the controller 216. The controller 216 can be configured to cause the power conversion circuitry 212 (e.g., the one or more power switches) of the slave power supply device 204 to be turned off until the SL fault has been cleared.

In yet further examples, the master power supply device 202 includes undervoltage (UV) detection circuitry 246 for protection against UV faults. The UV detection circuitry 246 can be configured to monitor the output voltage ($V_{OUT}$) being provided by the master power supply device 202 and output an UV protection signal in response to detecting an UV fault. For example, if the output voltage ($V_{OUT}$) from the master power supply device 202 is equal to or greater to an output voltage reference, the UV detection circuitry 246 is configured to output the UV protection signal. The UV protection signal can be provided to the controller 214. The controller 214 can be configured to cause the power conversion circuitry 212 (e.g., the one or more power switches) of the master power supply device 202 to be turned off until the UV fault at the master power supply device 202 has been cleared.

In additional examples, the master power supply device 202 includes overvoltage (OV) detection circuitry 248 for protection against OV faults. The OV detection circuitry 248 can be configured to protect the master power supply device 202 against excessive output voltage ($V_{OUT}$). For example, the OV detection circuitry 248 is configured to monitor the output voltage ($V_{OUT}$) at the output node 220 of the master power supply device 202. The OV detection circuitry 248 is configured to generate an OV protection signal in response to the output voltage ($V_{OUT}$) exceeding an output voltage reference. The OV protection signal can be provided to the controller 214. The controller 214 can be configured to cause the power conversion circuitry 212 (e.g., the one or more power switches) to be turned off until the OV fault at the master power supply device 202 has been cleared.

Accordingly, the master and slave power supply devices 202, 204 can be configured with fault protection circuitry for protection against fault events, such as thermal and non-thermal fault events.

In the example of FIG. 2A, the master power supply device 202 includes a first fault communication circuit (FCC) 250 and the slave power supply device 204 includes a second FCC 252. In some examples, the first FCC 250 is the FCC 116 and the second FCC 252 is the FCC 114, as illustrated in FIG. 1. The first and second FCC 250, 252 can define (e.g., or form) the fault event communication system, as described herein. The first and second FCC 250, 252 can be employed to communicate fault event information between the master and slave power supply device 202, 204, as described herein.

For example, the slave power supply device 204 can be configured to generate a fault event signal 254 in response to experiencing a fault event. In some examples, the fault event signal 254 is provided by protection circuitry of the slave power supply device 204, such as the thermal detection circuitry 240, the OC detection circuitry 242 or the SL detection circuitry 244. Thus, in some examples, the fault event signal 254 is the over-temperature protection signal, the OC protection signal or the SL protection signal. In other examples, the fault event signal 254 is provided by the controller 216 of the slave power supply device 204. The controller 216 can be configured to be in communication with the protection circuitry and provide the fault event signal 254 based on a protection signal from the protection circuitry, such as the over-temperature protection signal, the OC protection signal or the SL protection signal. In either example, the fault event signal 254 is provided to the second FCC 252. The second FCC 252 is configured to communicate to the first FCC 250 to notify the master power supply device 202 that the slave power supply device is 204 is experiencing the fault event in response to the fault event signal 254.

In some examples, the second FCC 252 includes a switch 256 and a comparator 258. The switch 256 can be coupled to a ground 260 and further coupled to the node 226 to couple the switch 256 to the shared bus 228. The switch 256 includes a diode 262 and a FET 264. The diode can be connected in series with respect to a drain node and source node of the FET 264. The FET 264 can be configured to receive at a gate node the fault event signal 254. The FET 264 can be turned on (e.g., actuated, activated, etc.) to pull down the shared bus 228 for a time interval (e.g., 50 μs) in response to receiving the fault event signal 254. By pulling down the shared bus 228, the shared bus voltage ($I_{SHARED}$) can decrease because the bus current will flow to the ground 260 through the FET 264. The pulling of the shared bus 228 down can indicate that the slave power supply device 204 is experiencing the fault event. Thus, the pulling of the shared bus 228 down can communicate to the first FCC 250 that the slave power supply device 204 is experiencing the fault event.

As shown in the example of FIG. 2B, the comparator 258 is coupled to the node 226 and configured to compare the shared bus voltage ($I_{SHARED}$) to a reference voltage ($V_{R2}$). In some examples, the comparator 258 is an amplifier circuit. The comparator 258 can be configured to generate a fault alert signal ($V_{F2}$) in response to the shared bus voltage ($I_{SHARED}$) being equal to or less than the reference voltage ($V_{R2}$). The fault alert signal ($V_{F2}$) can be provided to logic circuitry 266 of the second FCC 252 that is coupled to the comparator 258. The logic circuitry 266 can be implemented in the controller 216 and/or other components (e.g., circuits and gates).

In some examples, the logic circuitry 266 is configured to receive both the fault alert signal ($V_{F2}$) and the fault event signal 254 (e.g., over a same time interval). By receiving both the fault alert signal ($V_{F2}$) and the fault event signal 254 can be indicative of a confirmation that fault event information has been communicated to the master power supply device 202 via the shared bus 228. The logic circuitry 266 can be configured to communicate with the controller 216 to notify the controller 216 that the fault event information has been communicated to the master power supply device 202. In response to the fault event, the controller 216 can be configured to cause respective power conversion circuitry 212 (e.g., the one or more power switches) to be turned off until the fault event at the slave power supply device 202 has been cleared. For example, in response to a thermal fault event at the slave power supply device 204, the slave power supply device 204 is configured to cease switching operations and hold the shared bus 228 down to provide an indication that the slave power supply device 204 is experiencing the thermal fault event. In these examples, the slave power supply device 204 is configured to hold shared bus 228 down until the thermal fault event at the slave power supply device 204 has cleared. In other examples, in response to a non-thermal fault event at the slave power supply device 204, the slave power supply device 204 is configured to cease switching and pull down the shared bus 228 for a period of time and release the shared bus 228 to provide an indication that the slave power supply device 204 is experiencing a non-thermal fault event.

In further examples, the first FCC 250 is configured to monitor the shared bus 228 for a decrease in voltage of the shared bus voltage ($I_{SHARED}$). The first FCC 250 includes a switch 268 and a comparator 270, as illustrated in FIG. 2A. The switch 268 can be coupled to a ground 272 and further coupled to the node 224 to couple the switch 268 to the shared bus 228. In some examples, the ground 272 and the ground 260 are similar grounds (e.g., earth ground, chassis ground, etc.). The switch 268 includes a diode 274 and a FET 276. The diode 274 can be connected in series with respect to a drain node and a source node of the FET 276. The FET 276 can be configured to receive at a gate node a fault event signal. In some examples, the comparator 270 is an amplifier circuit.

The comparator 270 can be coupled to the node 224 and configured to compare the shared bus voltage ($I_{SHARED}$) to a reference voltage ($V_{R1}$). In some examples, the reference voltage ($V_{R1}$) is similar to the reference voltage ($V_{R2}$). The comparator 270 can be configured to generate a fault alert signal ($V_{F1}$) in response to the shared bus voltage ($I_{SHARED}$) being equal to or less than the reference voltage ($V_{R1}$), such as in response to the fault occurring at slave power supply device 204. The fault alert signal ($V_{F1}$) can be provided to logic circuitry 278 of the first FCC 250. The logic circuitry 278 can be implemented in the controller 214 and/or other components (e.g., circuits and gates). The logic circuitry 278 can be configured to determine the type of fault event that the slave power supply device 204 is experiencing based on the shared bus voltage ($I_{SHARED}$). The logic circuitry 278 can be configured to receive the fault alert signal ($V_{F1}$). The logic circuitry 278 can initiate (e.g., start) a timer 280 of the first FCC 250 for a time interval (e.g., 76 μs) in response to receiving the fault alert signal ($V_{F1}$). The logic circuitry 278 can be configured to determine the type of fault event (e.g., thermal fault or non-thermal fault event) occurring at the slave power supply device 204 based on the fault alert signal ($V_{F1}$) and a duration of time that has elapsed since the timer 280 has been initiated. In some examples, the timer 280 is a respective timer of the controller 214.

In further examples, the logic circuitry 278 is configured to monitor the fault alert signal ($V_{F1}$) for a transition from a first state (e.g., "HIGH") to a second state (e.g., "LOW") in response to initiating the timer 280 for the time interval. The logic circuitry 278 can be configured to determine that the slave power supply device 204 is experiencing a non-thermal type of fault event, such as the sync loss event, in response to determining that the fault alert signal ($V_{F1}$) is in the second state and determining that the timer 280 has not expired. The logic circuitry 278 can be configured to cause the master power supply device 202 to enter the power cycling mode (e.g., hiccup mode) by providing a mode control signal 282 to the controller 214. The controller 214 can be configured to cause the master power supply device 202 to switch (e.g., change) modes of operations from a first mode of operation to a second mode of operation (e.g., the power cycling mode) based on the mode control signal 282. Accordingly, the master power supply device 202 can be configured to switch (e.g., change) modes of operations based on the determined type of fault event for the slave power supply device 204. The master power supply device 202 can be configured to cause the slave power supply device 204 to enter a similar mode of operation by pulling down the shared bus 228 in response to determining that the slave power supply device 204 is experiencing the non-thermal fault event. In some examples, the logic circuitry 278 is configured to keep the master power supply device 202 in the power cycling mode until the non-thermal fault event at the slave power supply device 204 is cleared. The master power supply device 202 can be configured to hold the shared bus 228 down while in the power cycling mode and release the shared bus 228 in response to the fault being cleared at the slave power supply device 204 to cause the slave power supply device 204 to resume normal operations. The slave power supply device 204 can detect the pulling of the shared bus 228 down and switch modes of operations to the power cycle mode (e.g., until the shared bus 228 is released by the master power supply device 202).

In some examples, the timer 280 is configured to output a timer expiration signal, such as to signify when the time interval has expired. The logic circuitry 278 can be configured to receive the timer expiration signal. The logic circuitry 278 can be configured to detect the state of the fault alert signal ($V_{F1}$) in response to the receiving the timer expiration signal. The logic circuitry is configured to determine that the slave power supply device 204 is experiencing a thermal type of fault event, such as the TSD event in response to detecting that the fault alert signal ($V_{F1}$) is in the first state when the time interval has expired for the timer 280. The logic circuitry 278 can be configured to generate the mode control signal 282 to cause the master power supply device 202 to enter a stand-by mode until the thermal event at the slave power supply device 204 is cleared. In the stand-by mode, the master power supply device 202 can be configured to cease switching operations of the respective power conversion circuitry 212 until the thermal fault event at the slave power supply device 204 is cleared and resume normal operating conditions in response to the fault event being cleared. In a normal operating mode, the master power supply device 202 can be configured to resume switching operations to provide the output voltage ($V_{OUT}$).

Accordingly, the master power supply device 202 can be configured to enter a select mode of operation, such as the power cycling mode and the stand-by mode, based on the pulling of the shared bus 228 down by the second FCC 252 and the amount of time that has elapsed since the timer 280 has been initiated. In response to the fault being cleared at the slave power supply device 204, the master power supply device 202 is configured to restart and implement synchronization procedures with the slave power supply device 204 to synchronize the switching operations of the slave power supply device 204 with the master power supply device 202.

By way of further example, the master power supply device 202 is configured to generate a fault event signal 284 in response to experiencing a fault event. In some examples, the fault event signal 284 is provided by the protection circuitry of the master power supply device 202, such as the thermal detection circuitry 240, the OC detection circuitry 242, the SL detection circuitry 244, the UV detection circuitry 246 or the OV detection circuitry 248. Thus, in these examples, the fault event signal 284 is the over-temperature protection signal, the OC protection signal, the SL protection signal, the UV protection signal or the OV protection signal. In other examples, the fault event signal 284 is provided by the controller 214 of the master power supply device 202. The controller 214 can be configured to be in communication with the protection circuitry and provide the fault event signal 284 based on a protection signal from the protection circuitry, such as the over-temperature protection signal, the OC protection signal, the SL protection signal, the UV protection signal or the OV protection signal. In either example, the fault event signal 284 is provided to the first FCC 250. The first FCC 250 can be configured to communicate with the second FCC 252 to notify the slave power supply device 204 that the master power supply device 202 is experiencing the fault event based on the fault event signal 284. The slave power supply device 204 can be configured to enter a select mode of operation in response to the fault event at the master power supply device 202, such as until the fault event at the master power supply device 202 is cleared.

In some examples, the FET 276 of the switch 268 is configured to turned on (e.g., actuated, activated, etc.) to pull down the shared bus 228 for a time interval (e.g., 50 μs) in response to receiving the fault event signal 284. By pulling down the shared bus 228, the shared bus voltage ($I_{SHARED}$) can decrease because the bus current can flow through the FET 276 to the ground 272. The pulling of the shared bus 228 down can indicate that the master power supply device 202 is experiencing the fault event. Thus, the pulling of the shared bus 228 down can communicate to the second FCC 252 that the master power supply device 202 is experiencing the fault event.

The comparator 270 can configured to compare the shared bus voltage ($I_{SHARED}$) to the reference voltage ($V_{R1}$). In response to the shared bus voltage ($I_{SHARED}$) being equal to or less than the reference voltage ($V_{R1}$), the comparator 270 can be configured to generate the fault alert signal ($V_{F1}$). In some examples, the logic circuitry 278 is configured to receive both the fault alert signal ($V_{F1}$) and the fault event signal 284 (e.g., over a same time interval). By receiving both the fault alert signal ($V_{F1}$) and the fault event signal 284 can be indicative of a confirmation that fault event information has been communicated to the slave power supply device 204 via the shared bus 228. The logic circuitry 278 can be configured to communicate with the controller 214 to notify the controller 214 that the fault event information has been communicated to the slave power supply device 204. In response to the fault event, the master power supply device 202 can be configured to enter a mode of operation, such as the power cycling mode or the stand-by down mode based on the type of fault event that is occurring at the master power supply device 202. The master power supply device 202 can be configured to cause the slave power supply device 204 to enter a similar mode of operation as the master power supply device 202 in response to the fault event at the master power supply device 202, such that the slave power supply device 204 follows the mode of operation of the master power supply device 202.

In further examples, the second FCC 252 is configured to monitor the shared bus 228 for a decrease in voltage of the shared bus voltage ($I_{SHARED}$). The comparator 258 of the second FCC 252 can be configured to compare the shared bus voltage ($I_{SHARED}$) to the reference voltage ($V_{R2}$). The comparator 258 can be configured to generate the fault alert signal ($V_{F2}$) in response to the shared bus voltage ($I_{SHARED}$) being equal to or less than the reference voltage ($V_{R2}$), such as in response to the master power supply device 202 experiencing the fault event. The logic circuitry 266 can be configured to receive the fault alert signal ($V_{F2}$). The logic circuitry 266 can be configured to generate a mode control signal 286 based on the fault alert signal ($V_{F2}$) and provide the mode control signal 286 to the controller 216.

The controller 216 can be configured to cause the slave power supply device 202 to switch modes of operations from a first mode of operation to a second mode of operation based on the mode control signal 286 until the fault at the master power supply device 202 is cleared. Thus, for non-thermal fault events, the slave power supply device 204 can enter the power cycle mode until the non-thermal fault is cleared at the master power supply device 202. In response to the non-thermal fault event being cleared at the master power supply device 202, the slave power supply device 204 can be configured to resume normal operating conditions (e.g., change from the select mode of operation (e.g., the power cycle mode) to a normal mode of operation) and can synchronize switching operations with the master power supply device 202.

Accordingly, the fault event communication system enables the master and slave power supply devices to communicate fault event information. The fault event communication system allows the master power supply device 202 to enter a select mode of operation based on a type of fault event that the slave power supply device 204 is experiencing so that abnormal operations (e.g., undesired behaviors) of the master power supply device 202 can be avoided (or reduced). For thermal fault type of events at the slave power supply device 204, the master power supply device 202 can be configured to enter a stand-by mode of operation during which the master power supply device 202 is configured to cease switching operations until the thermal fault event at the slave power supply device 204 has been cleared. For non-thermal fault type of events at the slave power supply device 204, the master power supply device 202 can be configured to enter the power cycle mode until the non-thermal fault event is cleared at the slave power supply device 204. In response to a fault event (e.g., the thermal or non-thermal fault event) being cleared at the slave power supply device 204, the master and slave power supply devices 202, 204 can be configured to resume normal operations.

Thus, the fault event communication system enables the master power supply device 202 to differentiate between thermal and non-thermal fault events that may occur at slave power supply devices 202 based on the shared bus voltage ($I_{SHARED}$). The mode of operation of the master power supply device 202 can be controlled (e.g., regulated) such that the master power supply device 202 does not power cycle (e.g., hiccup) while the slave power supply device 204 is cooling down in response to experiencing the thermal fault event, which can cause strains and stresses on components (e.g., the power conversion and output circuitry 212 and 218) of the master power supply device 202. Thus, the fault event communication system can reduce (or alleviate) strains and stresses on components of the master power supply device 202 by minimizing power cycling of the master power supply device 202 during thermal fault events at the slave power supply device 204. Moreover, the fault event communication system allows for employing of existing nodes (e.g., pins) of the master and slave power supply devices 202, 204 for communication of different types of fault events, and thus does not require additional components and circuitry for communication of fault information.

Figure 3:
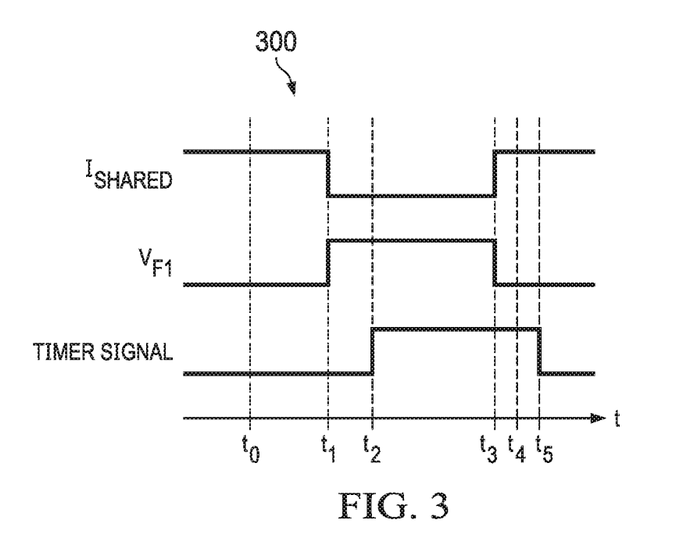
FIG. 3 illustrates an example of a voltage and timing diagram.

FIG. 3 illustrates an example of a voltage and timing diagram 300. The voltage and timing diagram 300 can be associated with operation of a fault communication circuit (FCC), such as the FCC 116, as illustrated in FIG. 1 or the first FCC 250, as illustrated in FIGS. 2A-2B. Therefore, reference may be made to the example of FIGS. 1 and 2 in the following description of the example of FIG. 3.

At a time $t_0$, an FCC of a first power supply device (e.g., the FCC 116 of the first power supply device 102) is configured to receive a shared bus voltage ("$I_{SHARED}$," as illustrated in FIG. 3). The shared bus voltage can be established at a shared bus (e.g., the shared bus 110) between the first power supply device and a second power supply device (e.g., the second power supply device 104). The first and second power supply devices may be connected in parallel to a system load (e.g., the system load 206). The shared bus voltage can be representative of an average current ($I_{AVG}$) of the first and second power supply devices being provided as a load current ($I_{LOAD}$) to the system load. In other examples, the shared bus voltage is representative of a current being provided by the first power supply device to the system load.

In some examples, the shared bus is pulled down to ground by an FCC (e.g., the FCC 114) of the second power supply device for an interval of time in response to a fault event at the second power supply device. Pulling the shared bus down to ground causes the shared bus voltage to decrease. The FCC of the first power supply device includes a comparator (e.g., the comparator 128). At a time $t_1$, the comparator is configured to output a fault alert signal ("$V_{F1}$," as illustrated in FIG. 3) in response to determining that the shared bus voltage is equal to or less than a reference voltage (e.g., the reference voltage $V_{R1}$)).

The FCC of the first power supply device further includes logic circuitry (e.g., the logic circuitry 130). At a time $t_2$, the logic circuitry is configured to cause a timer (e.g., the timer 280) to provide a timer signal ("TIMER SIGNAL," as illustrated in FIG. 3) for an interval of time. In some examples, the logic circuitry is configured to provide the timer signal in response to receiving the fault alert signal. At a time $t_3$, the fault alert signal can transition from a first state (e.g., "HIGH") to a second state (e.g., "LOW") caused by a change in state of the shared bus voltage. At a time $t_4$, the logic circuitry is configured to determine whether the timer signal has expired in response to determining that the fault alert signal is in the second state. The logic circuitry is configured to cause the first power supply device to enter a power cycle mode (e.g., a hiccup mode) in response to the logic circuitry determining that the timer has not expired. By determining that the fault alert signal is in the second state and that the timer signal has not yet expired can indicate that the second power supply device is experiencing a non-thermal fault event. In other examples, the logic circuitry can use the timer to determine a duration of time that the fault alert signal is in the second state.

Figure 4:
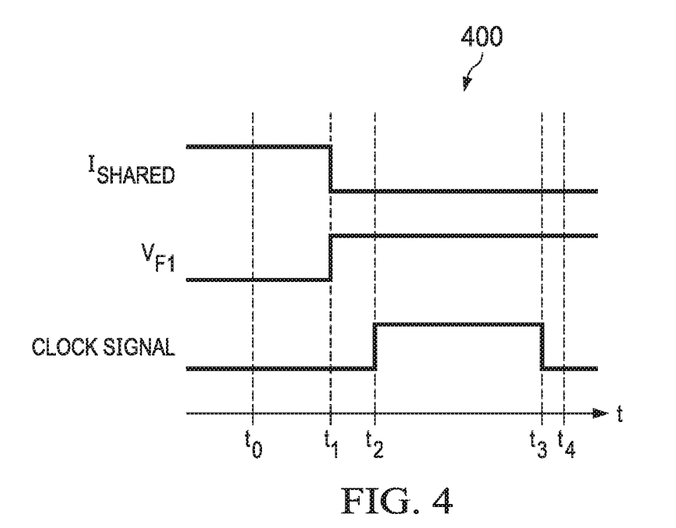
FIG. 4 illustrates another example of a voltage and timing diagram.

FIG. 4 illustrates an example of a voltage and timing diagram 400. The voltage and timing diagram 400 can be associated with operation of a fault communication circuit (FCC), such as the FCC 116, as illustrated in FIG. 1 or the first FCC 250, as illustrated in FIGS. 2A-2B. Therefore, reference may be made to the example of FIGS. 1 and 2 in the following description of the example of FIG. 4.

At a time $t_0$, an FCC of a first power supply device (e.g., the FCC 116 of the first power supply device 102) is configured to receive a shared bus voltage ("$I_{SHARED}$," as illustrated in FIG. 4). The shared bus voltage is established at a shared bus (e.g., the shared bus 110) between the first power supply device and a second power supply device (e.g., the second power supply device 104). The first and second power supply devices can be connected in parallel relative to a system load (e.g., the system load 206). The shared bus voltage can be representative of an average current of the first and second power supply devices being provided as a load current ($I_{LOAD}$) to the system load. In other examples, the shared bus voltage is representative of a current being provided by the first power supply device to the system load.

In some examples, the shared bus is pulled down to ground by an FCC of the second power supply device (e.g., the FCC 114 of the second power supply device 104) in response to a fault event at the second power supply device. Pulling the shared bus down to ground causes the shared bus voltage to decrease. The FCC of the first power supply device includes a comparator (e.g., the comparator 128). At a time $t_1$, the comparator is configured to output a fault alert signal ("$V_{F1}$," as illustrated in FIG. 4) in response to determining that the shared bus voltage is equal to or less than a reference voltage (e.g., the reference voltage ($V_{R1}$)).

By way of further example, the FCC of the first power supply device further includes logic circuitry (e.g., the logic circuitry 130). At a time $t_2$, the logic circuitry is configured to cause a timer (e.g., the timer 280) to provide a timer signal ("TIMER SIGNAL," as illustrated in FIG. 4) for an interval of time. At a time $t_3$, the logic circuitry is configured to receive a timer expiration signal from the timer that indicates that the time interval has expired. At a time $t_4$, the logic circuitry is configured to detect the state of the fault alert signal in response to receiving the timer expiration signal. At a time $t_4$, the logic circuitry is configured to cause the first power supply device to enter a stand-by mode in response to determining that the fault alert signal is in a first state (e.g., "HIGH"). By determining that the timer signal has expired and that the fault alert signal is in the first state can indicate that the second power supply device is experiencing a thermal fault event. In other examples, the logic circuitry of the first power supply device determine the type of fault event based on a duration of time that has elapsed while the fault alert signal is in the first state.

Figure 5:
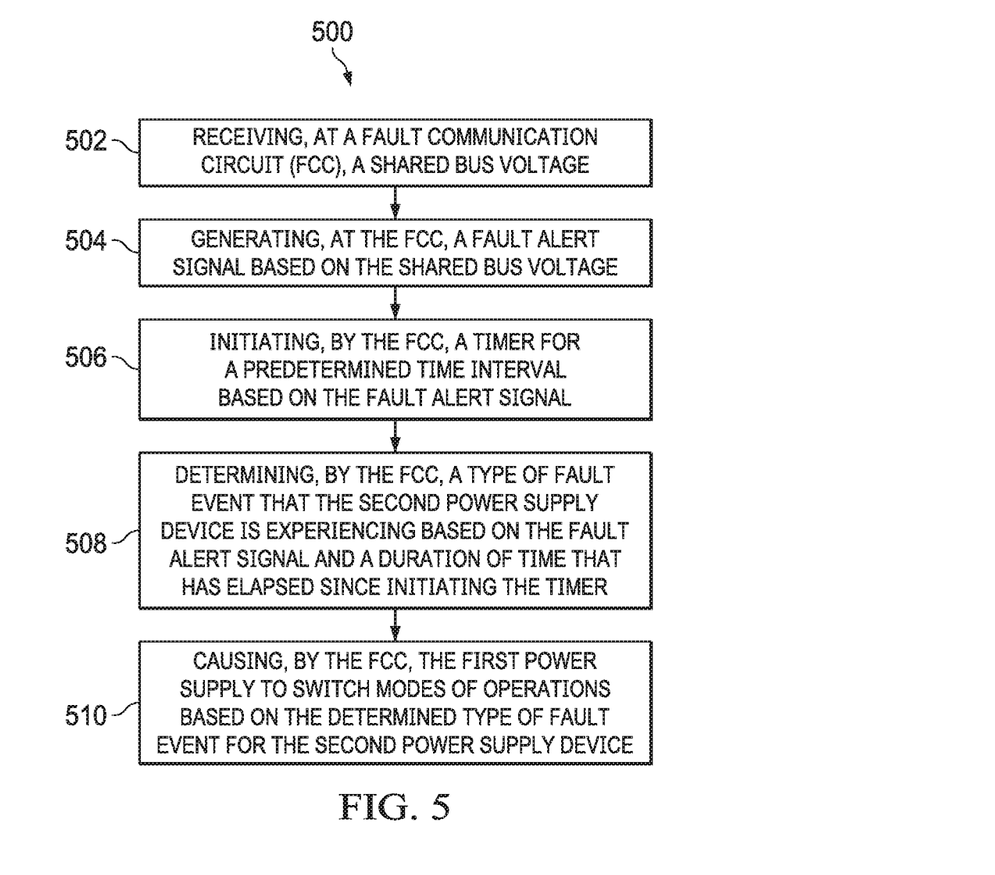
FIG. 5 illustrates an example of a method for communicating fault event information between power supply devices.

In view of the foregoing structural and functional features described above, example methods will be better appreciated with references to FIG. 5. While, for purposes of simplicity of explanation, the example method of FIG. 5 is shown and described as executing serially, it is to be understood and appreciated that the example method is not limited by the illustrated order, as some actions could in other examples occur in different orders, multiple times and/or concurrently from that shown and described herein.

FIG. 5 illustrates an example of a method 500 for communicating fault events between power supply devices. The power supply devices can include the first and second power supply devices 102, 104, as illustrated in FIG. 1 or the master and slave power supply devices 202, 204, as illustrated in FIGS. 2A-2B. The method 500 begins at 502 by receiving, at a fault communication circuit (FCC) (e.g., the FCC 116, as illustrated in FIG. 1 or the first FCC 250, as illustrated in FIG. 2A), a shared bus voltage (e.g., the shared bus voltage ($I_{SHARED}$)), as illustrated in FIGS. 1 and 2). The shared bus voltage can be established by current sharing circuitry (e.g., the current sharing circuitry 230, as illustrated in FIG. 2A).

At 504, the FCC is configured to generate a fault alert signal (e.g., the fault alert signal ($V_{F1}$), as illustrated in FIG. 1 or 2) in response to determining that the shared bus voltage is less than or equal to a reference voltage (e.g., the reference voltage ($V_{R1}$), as illustrated in FIG. 1 or 2). The fault alert signal can alert a respective power supply device (e.g., the first power supply device 102, as illustrated in FIG. 1 or the master power supply device 202, as illustrated in FIG. 2A) that another power supply device (e.g., the second power supply device 104, as illustrated in FIG. 1 or the slave power supply device 204, as illustrated in FIG. 2B) is experiencing a fault event. At 506, the FCC is configured to initiate a timer (e.g., the timer 280, as illustrated in FIG. 2A) for a time interval based on the fault alert signal. At 508, the FCC is configured to determine a type of fault event (e.g., a thermal fault event or a non-thermal fault event) that the other power supply device is experiencing based on the fault alert signal and a duration of time that has elapsed since initiating the timer. In an example, the timer can generate a signal to indicate that a time interval has expired. In another example, the timer can be used to track a duration that the fault event signal has been pulled low. At 510, the FCC is configured to cause the respective power supply device to switch (e.g., change) modes of operations from a first mode of operation (e.g., normal mode of operation) to a second mode of operation (e.g., power cycle mode (e.g., hiccup mode) or a stand-by mode) based on the determined type of fault event for the respective power supply device. The respective power supply device can be configured to remain in the second mode of operation until the fault event at the other power supply device is cleared.

In this description and the claims, the term "based on" means based at least in part on.

Modifications are possible in the described embodiments, and other embodiments are possible, within the scope of the claims.

What is claimed is:

1. A system comprising:
   first and second power terminals adapted to be coupled to a shared bus having a shared bus voltage, the first and second power terminals adapted to be coupled to first and second power supply devices, respectively;
   a comparator having first and second comparator inputs and a comparator output, the first comparator input coupled to the first power terminal, the second comparator input coupled to a reference voltage source providing a reference voltage, and the comparator output providing a fault alert signal indicating the second power supply device is experiencing a fault event;
   logic circuitry having an input coupled to the comparator output, the logic circuitry configured to initiate a timer for a time interval in response to receiving the fault alert signal, and further configured to determine a type of fault event at the second power supply device in response to the fault alert signal and a duration of time that has elapsed since initiating the timer, the first power supply device comprising a first fault communication circuit (FCC) including the comparator, the logic circuitry, and a switch coupled between the shared bus and a ground; and the second power supply device comprising a second FCC configured to selectively provide a path for current to flow from the shared bus to the ground in response to a fault event signal.

2. The system of claim 1, wherein the switch is a first switch, the second FCC includes a second switch coupled between the shared bus and the ground, wherein a circuit that provides the fault alert signal is one of a controller and a protection circuit of the second power supply device.

3. The system of claim 1, wherein:
the fault alert signal comprises a first state and a second state; and
the logic circuitry of the first FCC is configured to determine the type of fault event at the second power supply device by:
detecting a state of the fault alert signal; and
determining that the second power supply device is experiencing a non-thermal fault event in response to detecting that the fault alert signal is in the second state and determining that the timer has not expired.

4. The system of claim 1, wherein:
the fault alert signal comprises a first state and a second state; and
the logic circuitry is configured to:
determine that the timer has expired after the time interval;
detect a state of the fault alert signal in response to determining that the timer has expired; and
determine that the second power supply device is experiencing a thermal fault event in response to determining that the timer has expired and detecting that the fault alert signal is in the first state.

5. The system of claim 1, wherein the logic circuitry is configured to cause the first power supply device to change from a first mode of operation to a second mode of operation in response to the determined type of fault event for the second power supply device.

6. The system of claim 5, wherein the first mode of operation is a normal mode of operation and the second mode of operation is one of a power cycle mode and a stand-by mode.

7. A power supply system comprising:
a first power supply device comprising a first fault communication circuit (FCC) and a first power terminal, the first FCC being coupled to the first power terminal; and
a second power supply device comprising a second FCC and a second power terminal, the second FCC being coupled to the second power terminal, the first and second power terminals being coupled to a shared bus having a shared bus voltage between the first and second power supply devices; and
wherein:
the first FCC is configured to provide a path for current to flow from the shared bus to a ground in response to a fault event signal that indicates a fault event at the first power supply device; and
the second FCC is configured to provide a fault alert signal based on the shared bus voltage to alert the second power supply device that the first power supply device is experiencing the fault event, the second FCC further being configured to initiate a timer in response to the fault alert signal and determine a type of fault event that the first power supply device is experiencing based on the fault alert signal and a duration of time that has elapsed since initiating the timer.

8. The power supply system of claim 7, wherein the second FCC comprises a comparator, the comparator being coupled to the second power terminal and being configured to provide the fault alert signal in response to determining that the shared bus voltage is less than or equal to a reference voltage.

9. The power supply system of claim 8, wherein the second FCC further comprises logic circuitry and the timer, the logic circuitry being configured to initiate the timer for a time interval and determine the type of fault event that the first power supply device is experiencing based on the fault alert signal and the duration of time that has elapsed since initiating the timer.

10. The power supply system of claim 9, wherein the logic circuitry of the second FCC is configured to:
detect whether the fault alert signal is in a first state or a second state; and
determine that the first power supply device is experiencing a non-thermal fault event in response to detecting that the fault alert signal is in the second state and determining that the timer has not expired.

11. The power supply system of claim 10, wherein the non-thermal fault event comprises one of an overvoltage event, an overcurrent current event, an undervoltage event and a sync loss event.

12. The power supply system of claim 9, wherein the logic circuitry of the second FCC is configured to:
determine that the timer has expired;
detect whether the fault alert signal is in a first state or a second state in response to determining that the timer has expired; and
determine that the first power supply device is experiencing a thermal fault event in response to determining that the timer has expired and detecting that the fault alert signal is in the first state.

13. The power supply system of claim 8, wherein the first power supply device and the second power supply device are implemented on an integrated circuit substrate.

14. A circuit comprising:
a first power terminal adapted to be coupled to a first power supply device and adapted to be coupled to a shared bus;
a first fault communication circuit (FCC) comprising:
a first comparator having first and second comparator inputs and a comparator output, the first comparator input coupled to the first power terminal, and the second comparator input coupled to a first reference voltage source providing a first reference voltage;
first logic circuitry having a first logic input and a first logic output, the first logic input coupled to the comparator output; and
a first switch having first and second switch terminals and a control terminal, the first switch terminal coupled to the first power terminal, the second switch terminal coupled to a ground, and the control terminal coupled to the first logic output;
a second FCC comprising:
a second comparator having third and fourth comparator inputs and a second comparator output, the third comparator input coupled to a second power terminal that is adapted to be coupled to a second power supply device and adapted to be coupled to the shared bus, and the second comparator input is coupled to a second reference voltage source providing a second reference voltage;

a second logic circuitry having a second logic input and a second logic output, the second logic input coupled to the second comparator output; and a second switch having third and fourth switch terminals and a second control terminal, the third switch terminal coupled to the second power terminal, the fourth switch terminal coupled to the ground, and the second control terminal coupled to the second logic output;

wherein the second power terminal is adapted to be coupled to the shared bus; and current sharing circuitry configured to establish a shared bus voltage at the shared bus;

wherein:

the second switch is configured to provide a path for current to flow from the shared bus to the ground in response to a fault event signal that indicates a fault event at the second power supply device; and the first comparator is configured to provide a fault alert signal in response to determining that the shared bus voltage is less than or equal to the first reference voltage to alert the first power supply device that the second power supply device is experiencing the fault event.

15. The circuit of claim 14, wherein the first logic circuitry is configured to determine a type of fault event that the second power supply device is experiencing based on a state of the fault alert signal and a duration of time that has elapsed.

16. The circuit of claim 15, wherein the first logic circuitry is configured to provide a mode control signal to cause the first power supply device to change from a first mode of operation to a second mode of operation based the determined type of fault event for the second power supply device.

17. The circuit of claim 15, wherein the first logic circuitry is configured to start a timer for a time interval in response to receiving the fault alert signal, and further configured to determine the type of fault event that the second power supply device is experiencing based on the duration of time that has elapsed since initiating the timer and a state of the fault alert signal.

* * * * *